US007675534B2

(12) United States Patent
Fowlkes

(10) Patent No.: US 7,675,534 B2
(45) Date of Patent: Mar. 9, 2010

(54) PRINTER WITH SHORT PRINT-TO-PRINT CYCLE TIMES

(75) Inventor: William Y. Fowlkes, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 581 days.

(21) Appl. No.: 11/644,859

(22) Filed: Dec. 22, 2006

(65) Prior Publication Data

US 2008/0151035 A1 Jun. 26, 2008

(51) Int. Cl.

| | |
|---|---|
| ***B41J 2/325*** | (2006.01) |
| ***B41J 2/385*** | (2006.01) |
| ***B41J 29/38*** | (2006.01) |
| ***B41J 2/195*** | (2006.01) |
| ***B41J 17/28*** | (2006.01) |
| ***G01D 15/10*** | (2006.01) |

(52) U.S. Cl. .......................... 347/215; 347/153; 347/5; 347/7; 347/217; 347/173; 347/171; 347/174

(58) Field of Classification Search ................. 347/215, 347/153, 171, 173, 174, 5, 7, 217

See application file for complete search history.

(56) References Cited

U.S. PATENT DOCUMENTS

| | | | | |
|---|---|---|---|---|
| 4,638,331 | A | 1/1987 | Watanabe | |
| 4,794,404 | A * | 12/1988 | Shiraishi et al. | 347/174 |
| 4,815,872 | A | 3/1989 | Nagashima | |
| 5,157,413 | A | 10/1992 | Nagato et al. | |
| 5,440,328 | A | 8/1995 | Nardone et al. | |
| 5,611,629 | A | 3/1997 | Paranjpe | |
| 5,739,835 | A | 4/1998 | Morgavi et al. | |
| 5,798,783 | A | 8/1998 | Maslanka et al. | |
| 5,838,357 | A | 11/1998 | Maslanka et al. | |
| 5,841,460 | A | 11/1998 | Maslanka et al. | |
| 6,573,923 | B2 | 6/2003 | Hevenor et al. | |
| 2006/0158505 | A1 | 7/2006 | Jin | |
| 2006/0171755 | A1 | 8/2006 | Clarke | |

FOREIGN PATENT DOCUMENTS

| | | |
|---|---|---|
| EP | 0 225 582 | 6/1987 |
| JP | 59 114072 | 6/1984 |
| JP | 2003-145817 | 5/2003 |

* cited by examiner

*Primary Examiner*—Stephen D Meier
*Assistant Examiner*—Sarah Al-Hashimi
(74) *Attorney, Agent, or Firm*—Roland R. Schindler, II

(57) ABSTRACT

A receiver medium transport system for a thermal printer, a method for operating a receiver medium transport system and a thermal printer are provided that enable the recording of at least a portion of a second superimposed image on a second receiver medium during the recording of a first superimposed image on a first receiver medium.

16 Claims, 6 Drawing Sheets

| Step | First Receiver Medium 38a | Second Receiver Medium 38b |
|---|---|---|
| 120 | Receive Print Order | |
| 122 | Interpret Order and Determine Donor Images | |
| 124 | Determine Control Signals | |
| 126 | Pick and feed First Receiver Medium | |
| 128 | First Printhead Prints First Donor Image (Yellow) | |
| 130 | Second Printhead Prints Second Donor Image (Magenta) | |
| 132 | Return First Receiver Medium to Printing Path | |
| 134 | First Printhead Prints Third Donor Image (Cyan) | Pick and feed Second Receiver Medium |
| 136 | Second Printhead Prints Fourth Donor Image (Clear) | First Printhead Prints First Donor Image (Yelow) |
| 138 | Eject | Second Printhead Prints Second Donor Image Magenta) |
| 140 | | Return Second Receiver Medium to Printing Path |
| 142 | | First Printhead Prints Third Donor Image (Cyan) |
| 144 | | Second Printhead Prints Fourth Donor Image (Clear) |
| 146 | | Eject |

FIG. 4

| Step | First Receiver Medium 38a | Second Receiver Medium 38b |
|---|---|---|
| 170 | Receive Print Order | |
| 172 | Interpret Order and Determine Donor Images | |
| 174 | Determine Control Signals | |
| 176 | Pick and feed First Receiver Medium | |
| 178 | First Printhead Prints First Donor Image (Yellow) | |
| 179 | Advance First Receiver Medium to Second Printhead | Pick and feed Second Receiver Medium |
| 180 | Second Printhead Prints Second Donor Image (Magenta) | First Printhead Prints First Donor Image (Yellow) |
| 181 | Return First Receiver Medium to Printing Path | Advance Second Receiver Medium to Second Printhead |
| 182 | First Printhead Prints Third Donor Image (Cyan) | Second Printhead Prints Second Donor Image Magenta) |
| 183 | Advance First Receiver Medium to Second Printhead | Return Second Receiver Medium to Printing Path |
| 184 | Second Printhead Prints Fourth Donor Image (Clear) | First Printhead Prints Third Donor Image (Cyan) |
| 186 | Eject | Advance Second Receiver Medium to Second Printhead |
| 188 | | Second Printhead Prints Fourth Donor Image (Clear) |
| 190 | | Eject |

FIG. 6

PRINTER WITH SHORT PRINT-TO-PRINT CYCLE TIMES

FIELD OF THE INVENTION

The present invention relates to thermal dye diffusion printers, and more specifically to such printers having a plurality of print heads.

BACKGROUND OF THE INVENTION

A typical thermal printer uses a ribbon with three or four donor patches (cyan, magenta, yellow and optionally clear protective layer laminate). Printing is typically done by a single print head that receives electrical signals while pressed against the donor ribbon and a receiver. Generally, a temporary laminate of donor ribbon and receiver is pulled thru the nip by a capstan roller at a controlled rate so as to minimize speed variations that would result in banding artifacts in the image. At the conclusion of the printing using color donor material from one donor patch of an image, the print head is raised, the donor ribbon is advanced to align the next donor patch with the receiver, and the receiver is moved to a start-of-printing position. Printing with patches and a single head requires relocating the receiver between each printing step and positioning the next color patch so that each color image plane of information can be transferred in register to the receiver. While effective for good image quality, such a mode of operation is wasteful for productivity since the rewind steps represent a portion of the total printing time.

In recent years there have been dramatic improvements in costs and thru-put of thermal printing of photos. However, there is still a need in the industry for printing faster, with little or no additional investment in printing hardware. Some of the recent improvements in print time are related to system optimization to reduce processing time. However, most of the recent improvements have come from decreasing the line time of the printer, from a modest 5 msec per line down to as little as a 1 msec per line. At short line times such as the latter, fundamental problems in the thermal imaging become major problems. Sticking of the donor to the receiver due to inadequate cooling of the donor materials and asymmetric thermal smear due to build up of heat in the print head are two issues that become significantly problematic.

It is also known in the art to provide 4-headed thermal printers. With this technology, each print head uses an individual supply of single-color donor ribbon, and printing is done in a continuous motion from start to finish. No rewinding of the receiver is required, and printing speed is generally very high because there is only one continuous printing. The ML500 printer sold by Eastman Kodak Company of Rochester, N.Y., U.S.A. is an example of such a 4-headed printer, and U.S. Pat. No. 5,440,328 describes a printer with three heads for a cyan, magenta and yellow (CMY) system. The use of a plurality of heads that print substantially simultaneously eliminates the need to rewind the paper and greatly improves productivity. In these systems, the receiver, usually in the form of a paper web is fed in a serial manner past the plurality of print heads.

FIG. 1 schematically illustrates a printer 8 according to the prior art having four print heads, four donor assemblies and a medium supply feeding receiver medium to each of the print head and donor assemblies. In the embodiment of FIG. 1, the four print heads 10, 12, 14 and 16 are positioned circumferentially about a large drum 18. Print heads 10, 12, 14, and 16 are provided with a donor ribbon 20, 22, 24 and 26, respectively. A receiver medium 28 is threaded around drum 18 so as to be between drum 18 and donor ribbons 20, 22, 24 and 26. Receiver medium 28 moves clockwise, as viewed in FIG. 1, first past print head 10 where a yellow color donor image is transferred to first receiver medium 28. A magenta color donor image is transferred to receiver medium 28 by print head 12, and a cyan color donor image is transferred to receiver medium 28 at print head 14. At print head 16, a protective lamination layer is transferred in a uniform manner. Receiver medium 28 having a completed print formed thereon is then stripped from drum 18.

The design of FIG. 1 simultaneously eliminated the need to rewind receiver medium 28 between the printing of color image planes and greatly improved productivity. However, 4-head thermal printers are inherently more expensive to build than are single head devices. They can also be more expensive in operation. Only one print head is energized at a time during print jobs containing only one 4-color image plane image. For print jobs that contain more than a single 4-color image plane image, any of the four print heads 10, 12, 14, and 16 can print simultaneously on separate receiver webs (not shown). In some embodiments of this type of printer a large receiver web leader is required to feed the receiver medium 28 through the system. This leads to waste, as the receiver medium leader must be trimmed away and discarded.

U.S. Pat. No. 5,841,460 describes a system that circulates a receiver sheet around a circular track to pass by a single print head many times so that overall cycle time can be reduced by eliminating the time required to rewind the receiver medium. Similarly, U.S. Patent Publication No. 2006/0171755 describes a printing system that attempts to achieve a similar result without a recirculating path by using two print heads to record image information on a receiver medium that is passed by the print heads in a reciprocal manner along a substantially flat path. In the '755 publication, the first print head is adapted to print when the medium moves in one direction along the reciprocating path, and the second print head records an image when the receiver medium moves along the other direction along the reciprocating path. Such a system provides reduced printing time as the time period required to rewind the receiver sheet between printing different color image planes is used at least in part for printing. It will be appreciated, however, that systems described in U.S. Pat. No. 5,841,460 and in U.S. Patent Publication No. 2006/0171755 only print on one receiver medium at any particular time and thus the overall cycle time for printing a plurality of images is simply a function of the number of images multiplied by the cycle time.

Other printers attempt to conserve printing time by using multiple print heads to simultaneously record images on different sides of the same receiver medium see for example, U.S. Patent Publication No. 2006/0158505 which describes such a printer. However, here too, the cycle time required to sequentially print each individual one of the three color image planes or the protective lamination layer is not reduced, instead a dual sided image is created within the same cycle time and thus the amount of time required to print a plurality of such images is simply a function of the number of images multiplied by the cycle time.

What is needed in the art therefore is a thermal dye diffusion printer that has a reduced overall cycle time for printing a plurality of images.

SUMMARY OF THE INVENTION

A receiver medium transport system for a thermal printer, a method for operating a receiver medium transport system and a thermal printer for recording a first superimposed image on a plurality of receiver medium sheets are provided. The thermal printer comprises a first print head operable to record a first donor image and a third donor image forming a part of the a superimposed image on a receiver medium as the receiver medium passes through a printing nip between the first print head and a first platen, a second print head operable to record a second donor image and a fourth donor image forming a part of the superimposed image on a receiver medium as the receiver medium passes through a printing nip between the second print head and a second platen and a receiver medium transport system having a loading portion urging receiver medium from a supply to a printing path leading the first receiver medium past the first print head and second print head so that the first print head and second print head can transfer donor material to form the first donor image and second donor image of the superimposed image. A post printing system is provided having a return path that guides a leading edge of the receiver medium to return to the printing path or to an exit path, and a movable return path diverter operated by a controllable return path actuator, said return path actuator being operable to move the return path diverter so that a leading edge of the receiver medium can be caused to enter a selected one of the return path and the exit path. A controller is adapted to integrate the operation of the first thermal print head, the second thermal print head and the receiver medium transport system to cause the receiver medium transport system to urge a first receiver medium from the supply to the printing path and along the printing path so that the first donor image and the second donor image can be recorded thereon, said controller then causing the return path actuator to position the return path diverter so that the leading edge of the receiver medium is returned to the printing path so that the third donor image and the fourth donor image can be recorded to form a superimposed image, wherein said controller is further adapted to urge a second receiver medium to the printing path in a manner that allows the leading edge of the second receiver medium to enter the first printing nip before printing of the fourth image plane on the first receiver medium is complete so that the first print head can begin recording a first donor image for a second superimposed image on the second receiver medium before printing of the first superimposed image has completed.

BRIEF DESCRIPTION OF THE DRAWINGS

FIG. 4 is a table listing operational steps of a second mode of operation of the printer of FIG. 2;

FIG. 6 is a table listing operational steps of a second mode of operation of the printer of FIG. 5.

DETAILED DESCRIPTION OF THE INVENTION

Figure 1:
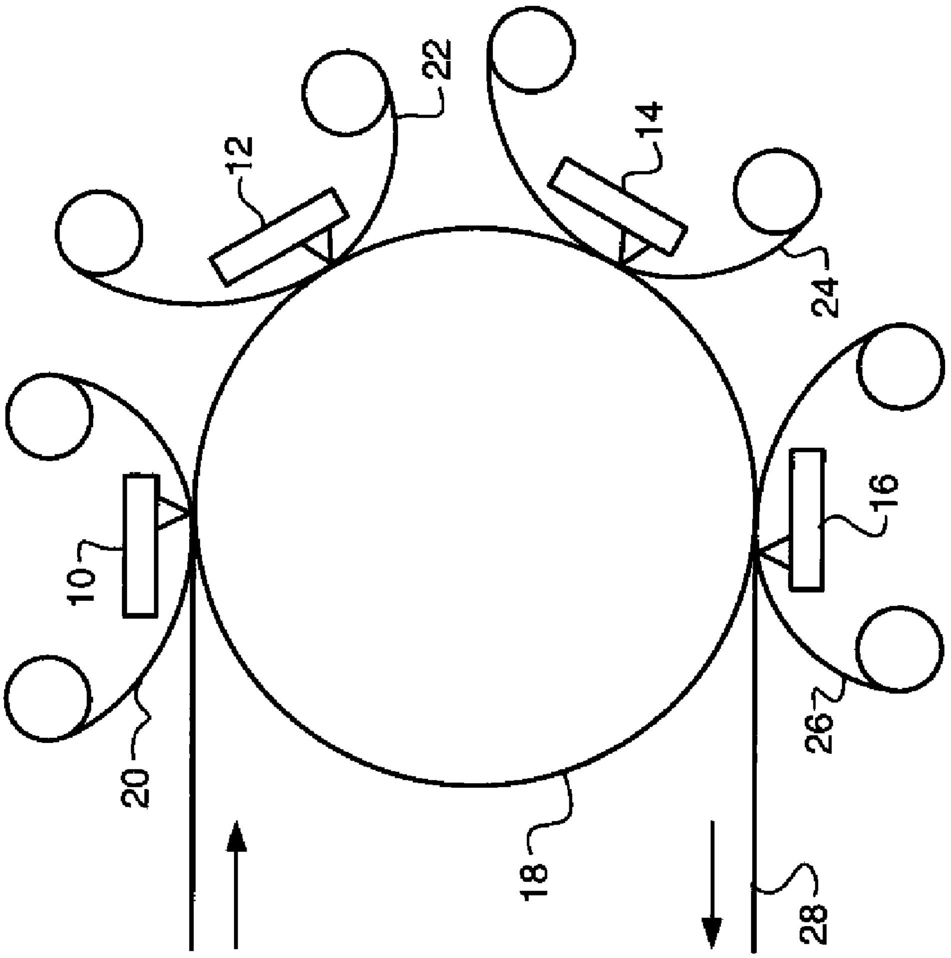
FIG. 1 (PRIOR ART)
FIG. 1 shows the layout of a printer according to the prior art having four print heads, four donor assemblies and a medium supply feeding receiver medium to each of the print head and donor assemblies.
Figure 2:
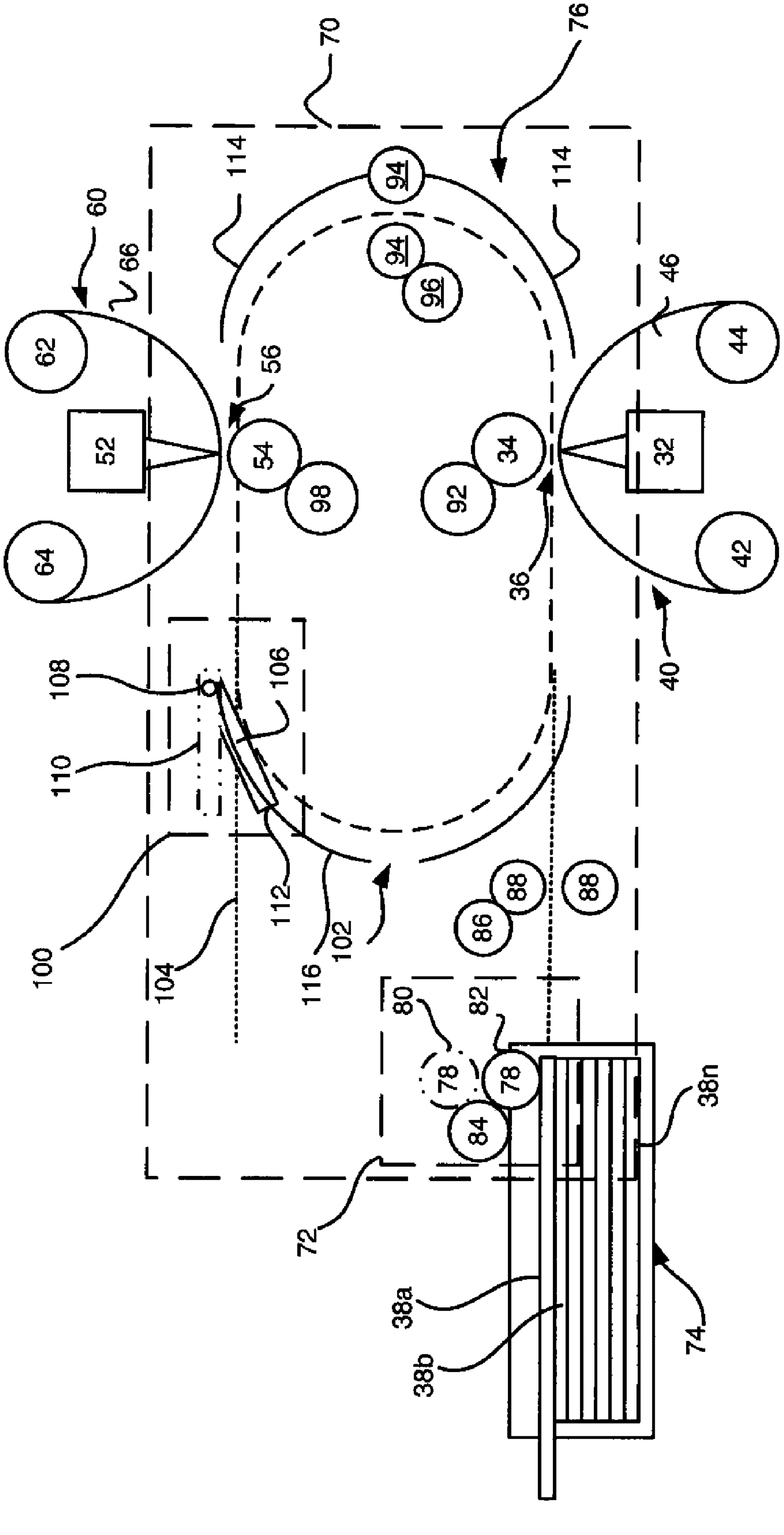
FIG. 2 schematically shows one embodiment of a printer printing on a receiver medium.
Figure 3:
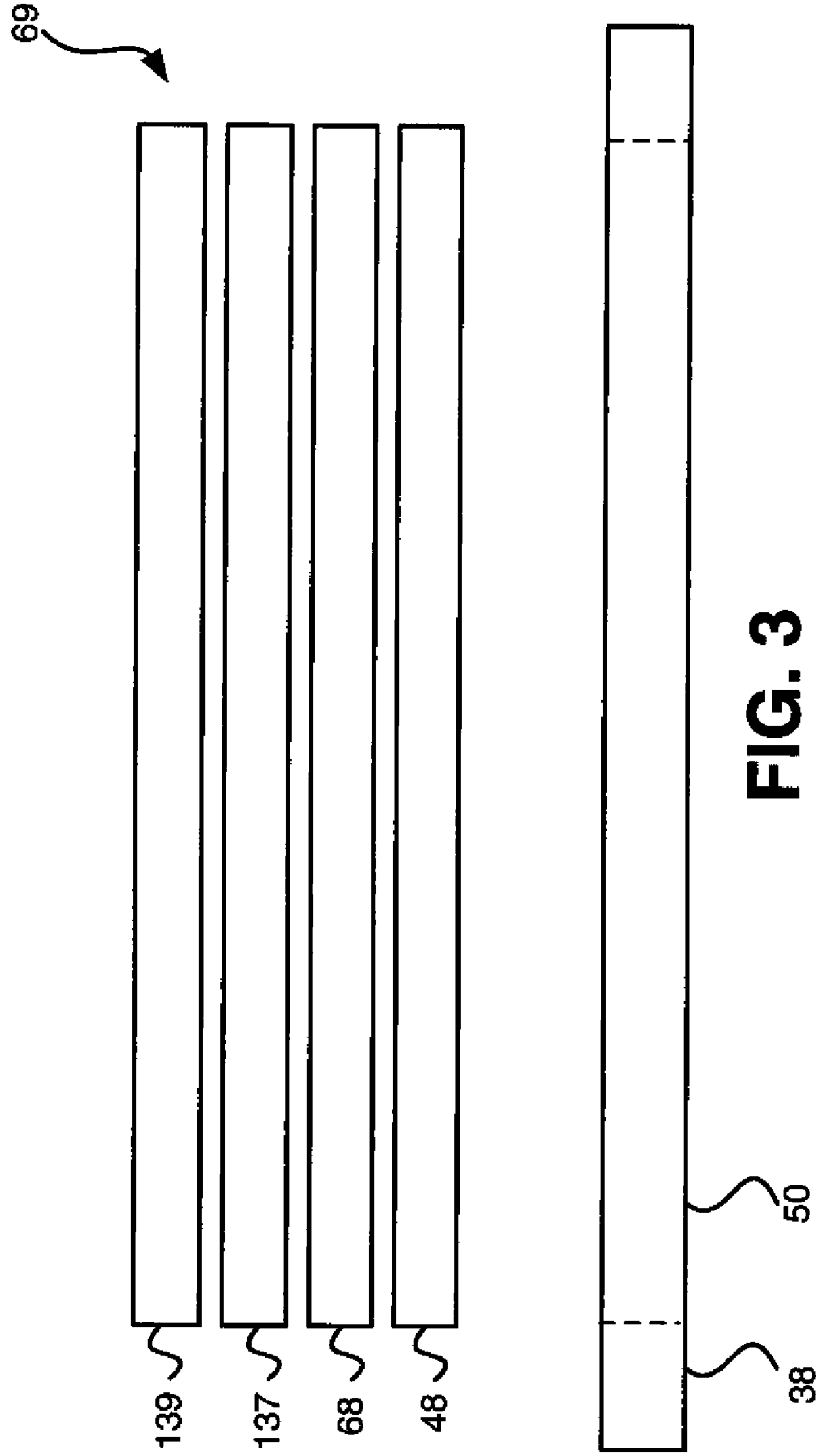
FIG. 3 is an exploded view showing the relationship between a receiver medium and first, second, third and fourth donor images formed thereon.

FIG. 2 shows a first illustrative embodiment of a printer 30. As is illustrated in FIG. 2, printer 30 has a first print head 32 confronting a first platen 34 to form a first printing nip 36 therebetween. A first donor supply 40 has a first donor supply spool 42 and a first take-up spool 44 with a supply of first donor web 46 disposed between first donor supply spool 42 and first take-up spool 44. First donor web 46 is positioned within first printing nip 36 so that first print head 32 can apply pressure through first donor web 46 and against a receiver medium 38 supported by first platen 34. During printing, first print head 32 can selectively heat various portions of first donor web 46 so as to cause the selective transfer of a donor material from first donor web 46 of receiver medium 38 to form a first donor image 48 in an image receiving area 50 of receiver medium 38 as illustrated in FIG. 3 which shows an exploded view illustrating the relationship between a receiver medium and first, second, third and fourth donor images formed thereon.

In the embodiment of FIG. 2, first print head 32 comprises a linear array of resistors that radiate various amounts of heat in proportion to a supplied electrical energy. However, first print head 32 can comprise any other form of thermal print head that can selectively radiate heat to enable donor material to be controllably transferred from first donor web 46 to receiver medium 38. During printing first donor supply 40 causes first donor web 46 to be advanced such that first print head 32 continually confronts unused portions of first donor web 46. This can be done, for example, by using a motor (not shown) to cause first take-up spool 44 to rotate in a manner that draws unused portions of first donor web 46 as required from first donor supply spool 42.

As is also illustrated in FIG. 2, printer 30 has a second print head 52 confronting a second platen 54 to form a second printing nip 56 therebetween. A second donor supply 60 has a second donor supply spool 62 and a second take-up spool 64 with a supply of a second donor web 66 disposed between second donor supply spool 62 and second take-up spool 64. Second donor web 66 is positioned within second printing nip 56 so that second print head 52 can apply pressure through second donor web 66 and against receiver medium 38 supported by second platen 54. During printing, second print head 52 can selectively heat various portions of second donor web 66 so as to occasion selective transfer of a donor material from second donor web 66 to receiver medium 38 to form a second donor image 68, in image receiving area 50 that is superimposed in registration with first donor image 48. This superimposed printing allows first print head 32 and second print head 52 to record differently colored donor materials in image receiving area 50 to form a multi-colored superimposed image 69 in image receiving area 50.

In the embodiment of FIG. 2, second print head 52 also comprises a linear array of resistors that radiate various amounts of heat in proportion to a supplied electrical energy. However, second print head 52 can comprise any other form of thermal print head that can selectively radiate heat to enable donor material to be controllably transferred from second donor web 66 to receiver medium 38. During printing, second donor supply 60 causes second donor web 66 to be advanced such that second print head 52 continually confronts unused portions of second donor web 66. This can be done, for example, by using a motor (not shown) to cause second take-up spool 64 to rotate in a manner that draws unused portions of second donor web 66 from second donor supply spool 62 through second printing nip 56 as needed to ensure that desired tones are recorded on receiver medium 38.

Receiver medium transport system 70 provides a loading system 72 for advancing receiver medium 38 out of a supply 74, to a printing path 76 that leads from supply 74 and through first printing nip 36 such that first print head 32 can record the first donor image 48 on receiver medium 38. Printing path 76 further leads to second printhead 52 that second print head 52 can record a second donor image 68 on receiver medium 38. Receiver medium transport system 70 also provides a post-printing system 100 that can be used to selectively return receiver medium 38 to printing path 76 for superimposed printing of a third image by first print head 32 and a fourth image by second print head 52 or to allow receiver medium 38 to travel to an exit path 104.

In the embodiment of FIG. 2 receiver medium transport system 70 has a loading system 72 that is adapted to urge a first receiver medium 38*a* from a supply 74 to printing path 76. Loading system 72 can be of any conventional design. In the embodiment illustrated in FIG. 3, loading system 72 has a pick roller 78 that can be moved between a first pick roller position 80 and a second pick roller position 82. When pick roller 78 is in second position 82, pick roller 78 engages a first receiver medium 38*a* which happens to be top-most in a stack of receiver mediums 38*a*-38*n* within supply 74. A pick roller motor 84 causes pick roller 78 to rotate in a manner that drives first receiver medium 38*a* out of supply 74 and loading system 72 and into printing path 76. A conventional actuator, such as a motor and optionally, conventional gearing or other structures (not shown) that can be used to move pick roller 78 between the first position 80 and the second position 82.

As is illustrated in FIG. 2, printing path 76 is used to urge first receiver medium 38*a* such that first receiver medium 38*a* can be engaged by a first pair of pinch rollers 88. A first pinch roller motor 86 is provided to drive first pair of pinch rollers 88 to advance first receiver medium 38*a* along printing path 76 at least until a leading edge 90 of first receiver medium 38*a* reaches first printing nip 36 accordingly, in this embodiment, pick roller 78 advances first receiver medium 38*a* until first pair of pinch rollers 88 can engage first leading edge 90.

Printing path 76 directs first receiver medium 38*a* through first printing nip 36 in a manner that allows first printhead 32 and first donor supply 40 to cooperate to selectively transfer donor material onto first receiver medium 38*a* in an image wise fashion to form first donor image 48 in image receiving area 50 of first receiver medium 38*a*. In the embodiment that is illustrated, a first platen motor 92 is provided to controllably rotate first platen 34. First platen motor 92 and first platen 34 are also used to drive leading edge 90 of first receiver medium 38*a* through first printing nip 36 to a point wherein second pinch rollers 94 can engage first receiver medium 38*a*. Second pinch rollers 94 are associated with a second pinch roller motor 96 that can be selectively operated to drive first receiver medium 38*a* along printing path 76 at least to second printing nip 56. First receiver medium 38*a* is advanced to pass through second printing nip 56 so that second printhead 52 can transfer donor material to form second donor image 68 in image receiving area 50 on first receiver medium 38*a*. In the embodiment illustrated, a second platen motor 98 is used to drive second platen 54 so as to advance first receiver medium 38*a* during printing.

After printing of second donor image 68, receiver medium transport system 70 delivers first receiver medium 38*a* to a post-printing system 100 having a return path 102 that permits a first leading edge 90 of first receiver medium 38*a* to return to printing path 76 or to an exit path 104. A movable return path diverter 106 is provided in post-printing system 100. The position of return path diverter 106 determines whether first receiver medium 38*a* travels along return path 102 or travels along exit path 104. In the embodiment illustrated in FIG. 2, an actuator 108 is provided and is connected to return path diverter 106. Actuator 108 is operable to move return path diverter 106 between a first position 110 that causes leading edge 90 of first receiver medium 38*a* to enter a return path 102 and a second position wherein leading edge 90 of first receiver medium 38*a* travels down an exit path 104.

In the embodiment illustrated in FIG. 2, receiver medium transport system 70 further comprises an arrangement of printing path guides 114 that are closely spaced along printing path 76 to support or guide movement of first receiver medium 38*a* from first printing nip 36 to second printing nip 56 and return path guides 116 that are spaced along return path 102 to support or guide movement of first receiver medium 38*a* as it travels from second printing nip 56 to first printing nip 36. In this embodiment, guides 114 and 116 take the form of static guide surfaces, such as rails or chutes, however other forms of guides can be used, including, but not limited to, pair of rollers, belts, guided platens and the like. Guides 114 and 116 can be passive as shown or dynamically operable to controllably guide or to urge first receiver medium 38*a* to move along printing path 76.

In other embodiments, receiver medium transport system 70 can provide any other conventional structures such as guide surfaces, stops and active components, such as controllable motors, solenoids or the like, as may be used to support or guide first receiver medium 38*a* to printing path 76, along printing path 76, along return path 102 or along exit path 104.

Printer 30 is operated by a controller 118 that integrates the operation of first print head 32, first donor supply 40, second print head 52, second donor supply 60 and receiver medium transport system 70 to cause simultaneous printing on at least a portion of two receiver mediums, first receiver medium 38*a* and a second receiver medium 38*b*. The following describes one embodiment of a method for operating printer 30 to accomplish printing of two superimposed images 69*a* and 69*b* in accordance with the steps described in table I shown in FIG. 4.

The method of FIG. 4 will be described in the context of an exemplary embodiment wherein first print head 32 is provided with a first donor web 46 with alternating patches of cyan and yellow donor material, while second print head 52 is provided with a second donor web 66 with alternating patches of magenta donor material and patches of a clear protective layer laminate. However, it will be appreciated that in other embodiments, a wide range of arrangements of patches and donor materials can be used on first donor web 46 and second donor web 66.

During printing, controller 118 acts in a conventional manner to convert data representing an image into first, second and third donor images representing cyan, yellow, magenta corresponding to the colors of the colored donor material patches on first donor supply 40 and second donor web 66. Similarly, a fourth donor image is printed that transfers a uniform layer of clear donor material or a patterned layer of clear donor material to provide any effects that can be created by selective application of such a clear donor material. Controller 118 then causes a superimposed image 69 to be printed on first receiver medium 38*a* by operating first print head 32, first donor supply 40, second print head 52, second donor supply 60, and receiver medium transport system 70 to move first receiver medium 38*a* to transfer donor material according to the respective donor images in registration on common image receiving area 50 of first receiver medium 38*a*.

In the method of FIG. 4, controller 118 receives a print order containing image data for at least two images to be printed (step 120). This can take, for example, the form of two different image data files or one image data file accompanied by a request that the one image data file be printed repeatedly. The print request can also take any of a number of well known forms.

Controller 118 interprets any instructions contained in the print request and acts in a generally conventional manner to convert data representing an image to be printed into a plurality of donor images (step 122). Each donor image is associated with a different one of the donor patches available on first donor web 46 and second donor web 66 and comprises instructions for printing using the donor material available in the associated donor patches. Controller 118 determines the content of each donor image intending that each of the donor images will be printed in registration in the image receiving area 50 to yield, in combination, a superimposed image 69 that corresponds to the image data for the image to be printed. Accordingly, where as here, first donor web 46 and second donor web 66 provide, respectively, yellow, cyan, magenta, and clear donor materials, donor images are generated based upon the image forming characteristics of the yellow, cyan, magenta, and the clear protective donor materials that are available on first donor web 46 and second donor web 66. Where first donor web 46 and second donor web 66 provide other colors for forming a superimposed image 69, then controller 118 can act in a similar manner to convert the data representing an image to be printed into a series of donor images that correspond to the colors, or laminate or other donor materials provided by first donor web 46 and second donor web 66.

Controller 118 determines a sequence of thermal print head control signals for printing on first receiver medium 38*a* and for printing on second receiver medium 38*b*. The thermal print head control signals are adapted to cause the heating elements of first printhead 32 or second print head 52 to heat in a manner that causes donor material to transfer from first donor web 46 or second donor web 66 to form the determined donor images in registration on first receiver medium 38*a* and second receiver medium 38*b* and, respectively, a first superimposed image 69*a* and a second superimposed image 69*b* that correspond to the image data and print requests provided in the print order (Step 124). The determined thermal print head control signals are transmitted to first print head 32 and second print head 52 as necessary during printing and in concert with the movement of first receiver medium 38*a* and second receiver medium 38*b*.

Before printing begins, controller 118 sends signals causing pick roller 78 to move to second position 82 and to rotate so as to urge a first receiver medium 38*a* from supply 74 to printing path 76, which can be done, for example, by actuating motor to drive pick roller as discussed above (step 126).

Controller 118 then transmits signals causing receiver medium transport system 70 to move first receiver medium 38*a* along printing path 76 to a position proximate to first receiver medium 38*a* and to further cause first print head 32 and first donor supply 40 to cooperate to print first donor image 48 within image receiving area 50 of first receiver medium 38*a* (step 128). Controller 118 then transmits signal causing first receiver medium 38*a* to be positioned so that second print head 52 and second donor supply 60 can print second donor image 68 within image receiving area 50 using, for example, magenta donor material (step 130). Controller 118 then causes actuator 108 to position return path diverter 106 and takes such other action as is necessary to cause leading edge 90 of first receiver medium 38*a* to be returned to printing path 76 (step 132). Controller 118 then generates appropriate signals required to cause first printhead 32, first donor supply 40, and receiver medium transport system 70 to operate to transfer a cyan donor material to form a third donor image 137 in image receiving area 50 (step 134) in registration with first donor image 48 and second donor image 68, and cause second printhead 52, second donor supply 60, and receiver medium transport system 70 to cooperate to transfer clear donor material to form a fourth donor image 139 in image receiving area 50 to complete the formation of first superimposed image 69*a* (step 136).

During the printing of first superimposed image 69*a* for example, during printing of a third donor image (step 134) controller 118 is further adapted to cause receiver medium transport system 70 to urge a second receiver medium 38*b* into printing path 76 in a manner that allows leading edge 90 of the second receiver medium 38*b* to enter first printing nip 36 before printing of the fourth image on first receiver medium 38*a* (step 136) is complete so that first print head 32 can begin recording second superimposed image 69*b* before printing of the first superimposed image 69*a* has completed.

Controller 118 causes actuator 108 to position return path diverter 106 so that as first receiver medium 38*a* leaves second printhead 52, first leading edge 90 travels along exit path 104, and first receiver medium 38*a* is ejected. Meanwhile, controller 118 causes steps 140-146 to be performed in a manner that is substantially similar to the manner in which steps 130-138 are performed. This forms a second superimposed image 69*b*. This process can be repeated for as many receiver mediums 38*b*-38*n*, etc. as desired.

It will be appreciated that this design provides high productivity by enabling at least in part simultaneous printing of at least a portion of first superimposed image 69*a* on first receiver medium 38*a* and at least a portion of second superimposed image 69*b* on second receiver medium 38*b* without creating a risk that undesired artifacts will be formed in either superimposed image.

FIG. 4 illustrates another embodiment of printer 30. In the embodiment of FIG. 4 an optional printing path diverter 150 is provided and is movable between a first position 152 that is used to send a first receiver medium 38*a* along the shorter path 156 indicated by the dotted line so that it can be engaged by second print head 52 before being released by first print head 32. Printing path diverter 150 can then be moved to a second position 154 so that trailing edge 158 of first receiver medium 38*a* is free to travel a longer path 160 indicated by the solid line after first print head 32 completes printing. Similarly, a second receiver medium 38*b* can be deflected in return path 102 by a return path diverter 106 that is arranged to achieve a relatively short possible route 162 back to first print head 32 for printing. Printing path diverter 150 is automatically positioned by a printing path diverter actuator 162 in response to signals from controller 118 so as to selectively deflect a first receiver medium 38*a* or a second receiver medium 38*b* where advantageous.

After a second receiver medium 38*b* completes recording of a third donor image 137, additional receiver mediums 38 can be fed and the cycle repeats. A registration mechanism, such as described in U.S. Pat. No. 5,798,783, can be useful to maintain good positional accuracy of a receiver medium 38 as it moves from first print head 32 to second print head 52, however a variety of other methods can be used for this purpose.

In this way, the cycle times for recording two donor images on a single receiver medium can be reduced in that they can be performed, at least in part, simultaneously. This can be achieved in one embodiment by positioning first printing nip 36 and second printing nip 56 apart by a distance along the shorter path 156 that is shorter that a length of image receiving area 50.

Figure 5:
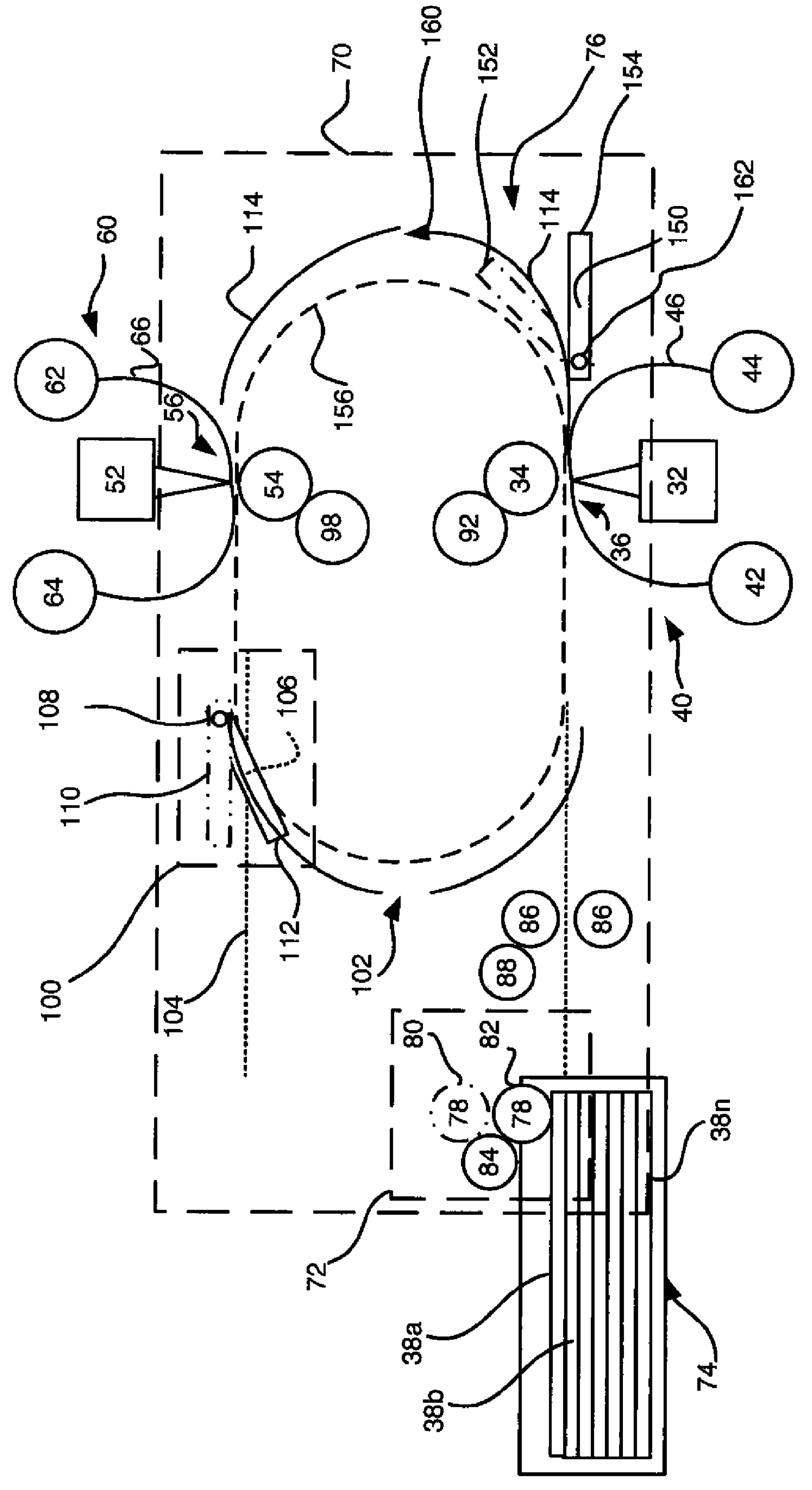
FIG. 5 schematically shows another embodiment of a printer printing on a receiver medium.

FIG. 6 provides a table illustrating another method for operating an embodiment of printer 30 such as for example the embodiment of FIG. 5, to achieve even greater reductions in the amount of time require to print a first superimposed image 69*a* and a second superimposed image 69*b*.

The method illustrated by Table II in FIG. 6 will be described in the context of an exemplary embodiment wherein first print head 32 is provided with a first donor web 46 with alternating patches of cyan and yellow donor material, while second print head 52 is provided with a second donor web 66 with alternating patches of magenta donor material and patches of a clear protective layer laminate. However, it will be appreciated that in other embodiments, a wide range of arrangements of patches and donor materials can be used on first donor web 46 and second donor web 66. During printing, controller 118 acts in a conventional manner to convert data representing an image into first, second and third donor images representing cyan, yellow, magenta corresponding to the colors of the donor material patches on first donor supply 40 and second donor web 66. Similarly, a fourth donor image is printed that transfers a uniform layer of clear donor material or a patterned layer of clear donor material to provide any effects that can be created by selective application of such a clear donor material. Controller 118 then causes a superimposed image 69 to be printed on first receiver medium 38*a* by operating first print head 32, first donor supply 40, second print head 52, second donor supply 60, and receiver medium transport system 70 to move first receiver medium 38*a* to transfer donor material according to the respective donor images in registration on common image receiving area 50 of receiver medium 38.

In the method of FIG. 6, controller 118 receives a print order containing image data for at least two images to be printed (step 170). This can take, for example, the form of two different image data files or one image data file accompanied by a request that the one image data file be printed repeatedly. The print request can also take any of a number of well known forms.

Controller 118 interprets any instructions contained in the print request and acts in a generally conventional manner to convert data representing an image to be printed into a plurality of donor images (step 172). Each donor image is associated with a different one of the donor patches available on first donor web 46 and second donor web 66 and comprises instructions for printing using the donor material available in the associated donor patches. Controller 118 determines the content of each donor image intending that each of the images will be printed in registration to yield in combination a superimposed image that corresponds to the image data for the image to be printed. Accordingly, where as here, first donor web 46 and second donor web 66 provide, respectively, yellow, cyan, magenta, and clear donor materials, donor images are generated based upon the image forming characteristics of yellow, cyan, magenta, and the clear protective donor materials that are available on first donor web 46 and second donor web 66. Where first donor web 46 and second donor web 66 provide other colors for forming a superimposed image 69, then controller 118 can act in a similar manner to convert the data representing an image to be printed into a series of donor images that correspond to the colors, or laminate or other donor materials provided by first donor web 46 and second donor web 66.

Controller 118 determines a sequence of thermal print head control signals for printing on first receiver medium 38*a* and for printing on second receiver medium 38*b* (step 174). The thermal print head control signals are adapted to cause the heating elements of first printhead 32 or second print head 52 to heat in a manner that causes donor material to transfer from first donor web 46 and second donor web 66 to form the determined donor images in registration on first receiver medium 38*a* and second receiver medium 38*b* and to provide, respectively, a first superimposed image 69*a* and a second superimposed image 69*b* that correspond to the image data and print requests provided in the print order (Step 174). The determined thermal print head control signals are transmitted to first print head 32 and second print head 52 as necessary during printing and in concert with the movement of first receiver medium 38*a* or second receiver medium 38*b*.

Before printing begins, controller 118 sends signals causing pick roller 78 to move to second position 82 and to rotate so as to urge first receiver medium 38*a* from supply 74 to printing path 76, which can be done, for example, by actuating motor to drive pick roller as discussed above (step 176).

Controller 118 then transmits signals causing receiver medium transport system 70 to move first receiver medium 38*a* along printing path 76 to a position proximate to first receiver medium 38*a* and to further cause first print head 32 and first donor supply 40 to cooperate to print first donor image 48 within image receiving area 50 of first receiver medium 38*a* (step 178).

Controller 118 then transmits signals causing first receiver medium 38*a* to be advanced to second printing nip 56 at second print head 52 while controller 118 further transmits signals that cause receiver medium transport system 70 to urge a second receiver medium 38*b* into printing path 76 in a manner that allows leading edge 90 of the second receiver medium 38*b* to enter first printing nip 36 before printing of the second donor image 68 on first receiver medium 38*a* is completed so that first print head 32 can begin recording a first donor image 48 on second receiver medium 38*b* at approximately the same time that the printing of a second donor image 68 on first receiver medium 38*a* is performed (step 179). Preferably the positioning of second receiver medium 38*b* is made such that printing can be performed simultaneously, however, complete simultaneity is not required. In other embodiments, second receiver medium 38*b* can be positioned during the printing of second donor image 68 on first receiver medium 38*a* so long as the positioning is completed in time to allow the printing of a first donor image 48 on second receiver medium 38*b* to be initiated before printing of the second donor image 68 on first receiver medium 38*a* is complete.

Controller 118 then generates signals causing first receiver medium 38*a* to be moved by receiver medium transport system 70 through second printing nip 56 so that second printhead 52 and second donor supply 60 can print second donor image 68 within image receiving area 50 on first receiver medium 38*a* using, for example, magenta donor material while controller 118 also transmits signals causing second receiver medium 38*b* to be moved by receiver medium transport system 70 through first printing nip 36 so that first print head 32 and first donor supply 40 can print first donor image 48 within image receiving area 50 of second receiver medium 38*b* using, for example, a yellow donor material (step 180).

After such printing, controller 118 causes actuator 108 to position return path diverter 106 and takes such other action as is necessary to cause leading edge 90 of first receiver medium 38*a* to be returned to printing path 76 while advancing a leading edge 90 of second receiver medium 38*b* to be positioned at second printing nip 56 (step 181).

Controller 118 then generates appropriate signals required to cause first printhead 32, first donor supply 40, and receiver medium transport system 70 to operate to transfer a cyan donor material to form a third donor image 137 in image receiving area 50 of first receiver medium 38*a* in registration with the first donor image 48 and the second donor image 68 previously recorded thereon while also generating appropriate signals required to cause second printhead 52, first donor supply 60, and receiver medium transport system 70 to operate to transfer a magenta donor material to form a second donor image 68 in image receiving area 50 of second receiver medium 38*b* in registration with the first donor image 48 previously recorded thereon. (Step 182)

Controller 118 then causes actuator 108 to position return path diverter 106 and takes such other action as is necessary to cause leading edge 90 of second receiver medium 38*b* to be returned to printing path 76 while advancing a leading edge 90 of first receiver medium 38*a* to be positioned at second printing nip 56 (step 183).

Controller 118 then generates signals causing first receiver medium 38*a* to be moved by receiver medium transport system 70 through second printing nip 56 so that second printhead 52 and second donor supply 60 can print fourth donor image 139 within image receiving area 50 of first receiver medium 38*a* using, for example, clear donor material or laminate while controller 118 also transmits signals causing second receiver medium 38*b* to be moved by receiver medium transport system 70 through first printing nip 36 so that first print head 32 and first donor supply 40 can print third donor image 137 within image receiving area 50 of second receiver medium 38*b* using, for example, a cyan donor material (step 186).

Controller 118 causes actuator 108 to position return path diverter 106 so that as first receiver medium 38*a* leaves second printhead 52, first leading edge 90 travels along exit path 104, and first receiver medium 38*a* is ejected. Meanwhile, controller 118 causes receiver medium transport system 70 to advance second receiver medium 38*b* to second printing nip 56 (step 188) and thereafter generates signals causing second printhead 52, second donor supply 60 and receiver medium transport system 70 to record a fourth donor image on second receiver medium 38*b* containing a clear donor material or laminate (step 190). This forms a second superimposed image 69*b* on second receiver medium 38*b* which can then be ejected in the same manner as first receiver medium 38*a* (step 192). This process can be repeated for as many receiver mediums 38*b*-38*n*, etc. as desired.

It will be appreciated that this design provides high productivity by enabling at least in part simultaneous printing of at least a portion of first superimposed image 69*a* on first receiver medium 38*a* and at least a portion of second superimposed image 69*b* on second receiver medium 38*b* without creating a risk that undesired artifacts will be formed in either superimposed image. Further, this embodiment, as compared to the embodiment of FIG. 4, increases the number of occasions wherein one donor image is recorded on first receiver medium 38*a* at least in part at the same time that a donor image is being recorded on second receiver medium 38*b* thus further reducing the overall cycle time required to print two superimposed images on two receiver mediums.

Further, it will be appreciated, that where printing is done in the manner described in FIG. 6, the overall length of travel provided by receiver medium transport system 70 from first printhead 32 to second printhead 52 must be sufficient to allow both first receiver medium 38*a* and second receiver medium 38*b* to travel without interference therein. However, to reduce the amount of travel time required between printing activities, printing path diverter 150 and return path diverter 106 and receiver medium transport system 70 can be arranged so that a leading edge of first receiver medium 38*a* and/or a leading edge of second receiver medium 38*b* are directed along the shorter path The embodiment of printer 30 described in FIG. 5 is used with this method. The return path diverter 106 and the printing path diverter 150 can be used to reduce the travel time for a leading edge 90 of first receiver medium 38*a* or second receiver medium 38*b* between first print head 32 and second print head 52 while allowing sufficient travel distance for a trailing edge of first receiver medium 38*a* or second receiver medium 38*b* to allow these trailing edges to exit from printing nips 36 and 56 to prevent conflicts between first receiver medium 38*a* and second receiver medium 38*b* at first printing nip 36 and at second printing nip 56.

In the above described embodiments, donor patches and donor materials within the donor patches are referred to comprising differently colored donor material and/or clear donor material. However, it will be appreciated that the donor material supplied by the different donor patches can comprise materials that are other than differently colored material and can include, for example, donor material provided to form layered combinations of such donor material such as may be useful for forming circuits or structures having desired electrical, mechanical, magnetic or optical properties. Further, it will be appreciated that image receiving area 50 can receive one or more than one superimposed image.

The invention has been described in detail with particular reference to certain preferred embodiments thereof, but it will be understood that variations and modifications can be effected within the spirit and scope of the invention.

PARTS LIST

8 prior art printer
10 print head
12 print head
14 print head
16 print head
18 drum
20 donor ribbon
22 donor ribbon
24 donor ribbon
26 donor ribbon
28 receiver medium
30 printer
32 first print head
34 first platen
36 first printing nip
38 receiver medium
38*a* first receiver medium
38*b* second receiver medium
38*n* $n^{th}$ receiver medium
40 first donor supply
42 first donor supply spool
44 first take-up spool
46 first donor web
48 first donor image
50 image receiving area
52 second print head
54 second platen
56 second printing nip
60 second donor supply
62 second donor supply spool
64 second take-up spool
66 second donor web
68 second donor image
69 superimposed image
69*a* first superimposed image
69*b* second superimposed image
70 receiver medium transport path
72 loading system
74 supply 76 printing path
78 pick roller
80 first pick roller position
82 second pick roller position
84 pick roller motor
86 first pinch roller motor
88 first pinch rollers
90 leading edge of receiver medium
92 first platen motor
94 second pinch roller
96 second pinch roller motor
98 second platen motor
100 post-printing system
102 return path
104 exit path
106 return path diverter
108 diverter actuator
110 first diverter position
112 second diverter position
114 printing path guides
116 return path guides
118 controller
120 receiver print order step
122 form donor images step
124 determine control signal step
126 pick first receiver medium step
128 record first donor image on first receiver medium step
130 record second donor image on first receiver medium step
132 return first receiver medium to printing path step
134 record third donor image on first receiver medium and pick and feed second receiver medium step
136 record fourth donor image on first receiver medium and print first donor image on second receiver medium step
137 third donor image
138 eject first receiver medium and print second donor image on second receiver medium step
139 fourth donor image
140 return second receiver medium to printing path step
142 print third donor image on second receiver medium step
144 print fourth donor image on second receiver medium step
146 eject second receiver medium step
150 printing path diverter
152 first position
154 second position
156 shorter path
158 trailing edge of receiver medium
160 longer path
162 printing path diverter actuator
170 receiver print order on first receiver medium step
172 interpret order and determine donor images on first receiver medium step
174 determine control signals on first receiver medium step
176 pick and feed first receiver medium step
178 first printhead prints first donor image on first receiver medium step
179 advance first receiver medium to second printhead and pick and feed second receiver medium step
180 second printhead prints second donor image on first receiver medium and first printhead prints first donor image on second receiver medium step
181 return first receiver medium to printing path and advance second receiver medium to second printhead step
182 first printhead prints third donor image on first receiver medium and second printhead prints second donor image on second receiver medium step
183 advance first receiver medium to second printhead and return second receiver medium to printing path step
184 second printhead prints fourth donor image on first receiver medium and first printhead prints third donor image on second receiver medium step
186 eject first receiver medium and advance second receiver medium to second printhead step
188 second printhead prints fourth donor image on second receiver medium step
190 eject second receiver medium step The invention clamed is:

1. A thermal printer comprising:

a first print head operable to record a first donor image and a third donor image forming a part of a superimposed image on a receiver medium as the receiver medium passes through a printing nip between the first print head and a first platen;

a second print head operable to record a second donor image and a fourth donor image forming a part of the superimposed image on a receiver medium as the receiver medium passes through a printing nip between the second print head and a second platen;

a receiver medium transport system having a loading portion urging receiver medium from a supply to a printing path leading the first receiver medium past the first print head and second print head so that the first print head and second print head can transfer donor material to form the first donor image and second donor image of the superimposed image;

a post printing system having a return path that guides a leading edge of the receiver medium to return to the printing path or to an exit path, and a movable return path diverter operated by a controllable return path actuator, said return path actuator being operable to move the return path diverter so that a leading edge of the receiver medium can be caused to enter a selected one of the return path and the exit path; and a controller adapted to integrate the operation of the first thermal print head, the second thermal print head and the receiver medium transport system to cause the receiver medium transport system to urge a first receiver medium from the supply to the printing path and along the printing path so that the first donor image and the second donor image can be recorded thereon, said controller then causing the return path actuator to position the return path diverter so that the leading edge of the receiver medium is returned to the printing path so that the third donor image and the fourth donor image can be recorded to form a superimposed image, wherein said controller is further adapted to urge a second receiver medium to the printing path in a manner that allows the leading edge of the second receiver medium to enter the first printing nip before printing of the fourth image plane on the first receiver medium is complete so that the first print head can begin recording a first donor image for a second superimposed image on the second receiver medium before printing of the first superimposed image has completed.

2. The thermal printer of claim 1, wherein the controller causes the leading edge of the second receiver medium to be fed to the first printing nip and further causes a first donor image to be recorded on the second receiver medium at least in part during the printing of the second donor image on the first receiver medium.

3. The thermal printer of claim 2, wherein after printing of the first donor image on the second receiver medium, the controller causes the second receiver medium to be advanced to the second print head and further causes a second donor image to be formed on the second receiver medium at least in part during the recording of the third donor image on the first receiver medium.

4. The thermal printer of claim 3, wherein after printing of the second donor image on the second receiver medium, the controller causes the second receiver medium to be returned to the first print head and further causes a third donor image to be formed on the second receiver medium at least in part during the recording of the fourth donor image on the first receiver medium.

5. The thermal printer of claim 4, wherein after the printing of the third donor image on the second receiver medium, the controller causes the second receiver medium to be advanced to the second print head and further causes a fourth donor image to be formed on the second receiver medium at least in part during a process of directing the first receiver medium to an exit.

6. The thermal printer of claim 1, wherein the controller causes the leading edge of the second receiver medium to be fed to the first printing nip so that a first donor image can be recorded on the second receiver medium at least in part during the printing of the fourth donor image on the first receiver medium.

7. The method of claim 1, wherein the controller causes the first receiver medium to travel along an exit path after the superimposed image is formed on the first receiver medium, while also advancing the second receiver medium to the second print head and moving the second receiver medium relative to the second print head so that a second donor image can be recorded on the second receiver medium in registration with the first donor image recorded on the second receiver medium.

8. The thermal printer of claim 1, further comprising a printing path diverter and a printing path diverter actuator that is adapted to drive the printing patch path diverter between two positions;

wherein said controller is a controller adapted to integrate the operation of the first thermal print head, the second thermal print head and the receiver medium transport system to cause the receiver medium transport system to urge a first receiver medium from the supply to the printing path and along the printing path so that the first donor image can be recorded thereon, said controller then causing the printing path diverter actuator to position the printing path diverter so that a leading edge of the receiver medium travels along a short path allowing the leading edge to be positioned at the second thermal printhead so that the second print head can begin recording a second donor image before printing of the first donor image has completed.

9. The thermal printer of claim 1, wherein said controller is further adapted to cause the printing path diverter actuator to position the printing path diverter to urge the first receiver medium to the printing path in a manner that allows the leading edge of the first receiver medium to enter the second printing nip so that the leading edge of the receiver medium is positioned at the second thermal printhead so that the second print head can begin recording a fourth superimposed image before printing of the third superimposed image has completed.

10. The thermal printer of claim 1, wherein said controller is further adapted to cause a return path actuator to position a return path diverter to urge the first receiver medium to the printing path in a manner that allows the leading edge of the first receiver medium to enter the first printing nip so that the leading edge of the receiver medium is positioned at the first thermal printhead so that the first print head can begin recording a third superimposed image before printing of the second superimposed image has completed.

11. The thermal printer of claim 1, wherein said first print head and said second print head are separated by a distance that is smaller than a length of an image receiving area on a first receiver medium so that printing of at least two donor images can occur, at least in part, simultaneously on the same receiver medium.

12. The thermal printer as set forth in claim 1, wherein the receiver medium transport system is adapted to move the receiver medium along the path without reversing movement of the receiver medium during the formation of the entire superimposed image.

13. A thermal printer as set forth in claim 1, wherein the first receiver medium is sized to receive only a single superimposed image.

14. A thermal printer as set forth in claim 1, wherein the first receiver medium is sized to receive two separate superimposed images.

15. A thermal printer as set forth in claim 1, wherein said controller causes recording of the first, second, and third donor images on the first receiver medium to be completed before the controller begins printing any donor images on a second receiver.

16. A receiver medium transport system for use in a printer having a first print head and a second print bead, the receiver medium transport system having:

a loading means controllably urging a receiver medium from a supply to a printing path means;

said printing path means controllably leading the first receiver medium past the first print head and second print head so that the first print head and second print head can transfer donor material to form the first donor image and second donor image of the superimposed image;

a post printing means for guiding a leading edge of the receiver medium to return to the printing path means or to an exit path;

a movable return pat diverter means operated by a controllable return path actuator means, said return path actuator means being operable to move the return path diverter means so that a leading edge of the receiver medium can be caused to enter a selected one of the return path means and the exit path means; and a controller means for causing the receiver medium transport system to urge a first receiver medium from the supply to the printing path and along the printing path so that the first donor image and the second donor image can be recorded thereon, said controller then causing the return path actuator to position the return path diverter so that the leading edge of the receiver medium is returned to the printing path so that the third donor image and the fourth donor image can be recorded to form a superimposed image, wherein said controller further causes the receiver medium transport system to urge a second receiver medium to the printing path means in a manner that allows the leading edge of the second receiver medium to enter the first printing nip before printing of the fourth image plane on the first receiver medium is complete so that the first print head can begin recording a first donor image for a second superimposed image on the second receiver medium before printing of the first superimposed image has completed.

* * * * *

UNITED STATES PATENT AND TRADEMARK OFFICE

CERTIFICATE OF CORRECTION

PATENT NO. : 7,675,534 B2
APPLICATION NO. : 11/644859
DATED : March 9, 2010
INVENTOR(S) : William Y. Fowlkes It is certified that error appears in the above-identified patent and that said Letters Patent is hereby corrected as shown below:

| Issued Patent Column | Line | Description of Error |
|---|---|---|
| 16 | 27 | In Claim 16, delete “bead,” and insert -- head --, therefor. |
| 16 | 40 | In Claim 16, delete “pat” and insert -- path --, therefor. |

Signed and Sealed this

Eighteenth Day of May, 2010

David J. Kappos
*Director of the United States Patent and Trademark Office*